United States Patent [19]

Kadelka

[11] Patent Number: 4,997,483

[45] Date of Patent: Mar. 5, 1991

[54] STABILIZING BITUMINOUS MATERIAL

[76] Inventor: Friedrich Kadelka, Bussardweg 18, D-2360 Bad Segeberg, Fed. Rep. of Germany

[21] Appl. No.: 276,202

[22] Filed: Nov. 23, 1988

[51] Int. Cl.$^5$ .............................................. C04B 14/06
[52] U.S. Cl. ...................... 106/670; 106/668
[58] Field of Search ...................... 106/96, 276, 281.1

[56] References Cited

U.S. PATENT DOCUMENTS 3,802,879  4/1974  McConnaughay .................. 106/96

OTHER PUBLICATIONS

DE 3716691.3, INAPADOC Family Search.

Primary Examiner—William R. Dixon, Jr.
Assistant Examiner—David M. Brunsman
Attorney, Agent, or Firm—Dvorak and Traub

[57] ABSTRACT

Finely divided aerated concrete is added as a stabilising additive to composite bituminous material for the production of cast and rolled asphalt. This additive, which is preferably applied in a quantity of 0.3% to 10% by weight, is not inferior to known additives, and is superior to many of them, but is inexpensive as compared with known additives.

10 Claims, No Drawings

STABILIZING BITUMINOUS MATERIAL

FIELD OF THE INVENTION

The invention relates to a new stabilising additive in bituminous composition material for the production of cast and rolled asphalt in particular for use in road surfacing, cast asphalt also being known as "poured" asphalt.

BACKGROUND OF THE INVENTION

A conventional road surface comprises three courses, namely the bottom base course, the middle binder course and the top wearing layer, which differ in their composition and thus in their pore contents. Whereas the wearing course has a pore content of about 2.5% to 3% by volume, the pore content of the binder course lies within the range from about 5% to 7% by volume, the base course having a pore content within the range from about 10% to 12% by volume. The wearing course essentially provides a seal and should accordingly be as far as possible dense and impervious to water. The base course is essentially for supporting axle loads and the binder course is mainly for bearing tangential stress generated by moving traffic. The binder course commonly comprises a high proportion of chippings within the range of about 65% to 75% by weight. The composite material for the wearing course has the highest binder content, about 5.7% to 9% by weight of bitumen and the lowest proportion of chippings, about 30% to 60% by weight. "Chippings" may be defined as having a particle size greater than about 2 mms. By comparison, sand has a particle size of about 0.09 to 2 mms. Finally, the charge or filler, commonly a fine rock powder, has a particle size smaller than 0.09 mm.

Stabilising additives such as organic and inorganic fibrous substances, with or without admixtures of inorganic materials, native asphalt, diatomaceous earth, fossil meal, trass or volcanic tuff, artificial and natural silicic acids, synthetic resins and polymer-modified bitumen (PmB), may be added to prevent track furrows and thereby to improve the stability of asphalt coatings, as referred to in "Complementary Technical Regulations and Directives for the Construction of Bituminous Roadway Surfaces"-ZTV to StB 84.

These additives in bituminous composition material for the production of cast and rolled asphalt stabilize, that is to say improve the resistance to deformation of, cast and rolled asphalt, and thus improve the reinforcement of the mortar contents. Such additives, which may be described as reinforcing agents, bind bitumen by virtue of their very large specific surface area and thereby greatly increase the "internal friction" between particles of inorganic substance and bitumen films.

The additives primarily used are disadvantageously costly.

An object of the invention is, therefore, to provide a stabilising additive for composite bituminous material for the production of cast and rolled asphalt, which is more economical than the additives referred to above, but which is equally, or indeed more, effective.

SUMMARY OF THE INVENTION

According to one aspect of the invention a composite bituminous material for the production of cast and rolled asphalt comprises a stabilising additive of finely divided, aerated concrete, and according to another aspect of the invention a method of producing a composite bituminous material for the production of cast and rolled asphalt, comprises the step of admixing with said bituminous material a stabilising additive of finely divided, aerated concrete.

Finely divided, aerated concrete is obtained by crushing aerated concrete. It was found that finely divided aerated concrete is an excellent stabilising additive to the composite bituminous material for the production of cast or rolled asphalt.

DETAILED DESCRIPTION OF THE INVENTION

The grain size of the finely divided aerated concrete may amount to 0 to 2 mms and preferably to 0 to 0.71 mm. A finely divided aerated concrete having a grain size of not more than 0.3 mm proved to be particularly preferable. In practice, this applies to a grain size from 0 to 2 mms, 0 to 0.7 mm or 0 to 0.3 mm, the fraction retained on the screening medium, which passes through all the screens, being included.

The composition and composition of aerated concrete are known for example from (DE-A-12 32 863, DE-A-12 54 654, DE-A-16 46 580, DE-A-27 09 858 and DE-A-28 013) which are incorporated herein by reference. The aerated grades of concrete disclosed in DE-A-16 46 580 proved to be highly appropriate for the purposes of the present invention, for example. As a rule, aerated grades of concrete which can be used for these purposes, are produced substantially from 40% to 65% by weight of sand, 5% to 25% by weight of fine white lime, 15% to 35% of cement (preferably Portland cement) and 0.5% to 10% by weight of anhydrous gypsum (calcium sulphate) with the use of conventional gas producing agents such as aluminium powder in particular. These fundamentals may, in practice, be modified in various ways. For example, part of the sand (up to 50%) may be replaced by fly ash or slate powder.

The quantity of the finely divided aerated concrete may be 0.3% to 10% by weight and preferably 1% to 3% by weight of the whole inorganic material composition.

The finely divided aerated concrete may be combined with the conventional stabilising additives referred to above. This applies in particular to siliceous acids, inorganic or organic fibrous materials, diatomaceous earth, fossil meal and trass. Improvements which are supplemental to those achieved by the use of finely divided aerated concrete alone, are occasionally achieved by the combined application of finely divided aerated concrete and a conventional stabilising additive. The admixture of a conventional stabilising additive with the finely divided aerated concrete commonly amounts to 10% to 50% by weight, in relation to the total weight of the finely divided aerated concrete and the conventional stabilising additive.

Experiments with finely divided aerated concrete having a grain size of 0 to 0.3 mm have demonstrated that a most satisfactory reinforcing effect is obtained therewith. For example, cast asphalt provided depths of impression (DIN 1996, part 12) lying within the range of up to 2.0 to 3.0 mms after a test period of 5 hours, even with comparatively small quantities of 1% to 3% by weight of added finely divided aerated concrete and a comparatively small proportion of chippings. The susceptibility of the product to water adsorption was also investigated according to TP Min, part 4.6.3.2., and a most favourable value of 0.69% by volume was obtained. According to ZTV-StB Hamb., para 5.1.1., table 2, the upper water adsorption limit for asphalt wearing courses is 1% by volume, and is 1.3% by volume for asphalt binder courses. A very high Marshall stability figure of 12.2 kN was finally achieved during these tests. The drop in stability to 10.4 kN that occurred after the adsorption of water, that is to say a drop in strength of approximately 15%, may also be regarded as being most advantageous.

The finely divided aerated concrete according to the invention is comparatively economical. The effect obtained with the same is not inferior to that of the known additives, but surpasses these in numerous cases.

EXAMPLE

A composite bituminous material for the production of cast asphalt with a grain size of 0 to 11 mms was produced form 44% by weight of chippings, 27.6% by weight of sand, 21.0% by weight of filler (limestone) and 7.4% by weight of bitumen, in all. The intermixing of the components was performed in a mixing plant and subsequently in a cast asphalt boiler at approximately 240° C.

In a first experiment, finely divided aerated concrete having a grain size of 0-0.3 mm, and being 20% by weight in relation to the mixture of inorganic substances, was admixed to the composite material. A sample was drawn from the boiler and cast into a shallow box mould. The cooled specimen was then tested in a standardised apparatus for measuring depths of impression. A depth of impression of 1.8 mms (mean value of two readings) was obtained at 40° C. and with a test period of 5 hours.

The same experiment carried out with native asphalt (Trinidad - Epure) yielded a depth of impression of 4.3 mms.

What is claimed is:

1. A composite bituminous material for the production of cast and rolled asphalt, comprising a stabilizing additive of finely divided, aerated concrete, wherein the grain size of said aerated concrete is in the range of 0 to 2.0 mms., wherein the aerated concrete essentially comprises from 40% to 65% by weight of sand, from 5% to 25% by weight of fine white lime, from 15% to 35% by weight of cement and from 0.5% to 10% by weight of calcium sulphate.

2. A composite material as claimed in claim 1, wherein the grain size of said aerated concrete is in the range 0 to 0.71 mm.

3. A composite material as claimed in claim 1, wherein the grain size of said aerated concrete in the range 0 to 0.30 mm.

4. A composite material as claimed in claim 1, wherein the quantity of said aerated concrete is 0.3% to 10% by weight, of said composite material.

5. A composite material as claimed in claim 1, wherein the quantity of said aerated concrete is 1.0% to 3.0% by weight, of said composite material.

6. A method of producing a composite bituminous material for the production of cast and rolled asphalt, the method comprising the step of admixing with said bituminous material a stabilizing additive of finely divided, aerated concrete, wherein the grain size of said aerated concrete is in the range of 0 to 2.0 mms. , comprising from 40% to 65% by weight of sand, from 5% to 25% by weight of fine white lime, from 15% to 35% by weight of cement and from 0.5% to 10% by weight of calcium sulphate.

7. A method as claimed in claim 6, wherein the grain size of said aerated concrete is in the range 0 to 0.71 mm.

8. A method as claimed in claim 6, wherein the grain size of said aerated concrete is in the range 0 to 0.30 mm.

9. A method as claimed in claim 6, wherein the aerated concrete is added in a quantity of 0.5 to 10% by weight of said composite material.

10. A method as claimed in claim 6, wherein the aerated concrete is added in a quantity of 1.0% to 3.0% by weight of the composite material.

* * * * *